United States Patent
Mortimer et al.

(10) Patent No.: US 9,314,992 B2
(45) Date of Patent: Apr. 19, 2016

(54) SANDWICH PANELS

(75) Inventors: Steve Mortimer, St. Ives (GB); Emille Legoff, Impington (GB); Bertrand Germain, Genas (FR); Clement Casaliggi, Villeurbanne (FR); Sarah Lasfargues, Lyons (FR)

(73) Assignees: Hexcel Composites, Ltd., Duxford (GB); Hexcel Composites, S.A.S., Dagneux (FR)

( * ) Notice: Subject to any disclaimer, the term of this patent is extended or adjusted under 35 U.S.C. 154(b) by 845 days.

(21) Appl. No.: 13/521,808

(22) PCT Filed: Jan. 17, 2011

(86) PCT No.: PCT/GB2011/050054
§ 371 (c)(1),
(2), (4) Date: Jul. 12, 2012

(87) PCT Pub. No.: WO2011/089414
PCT Pub. Date: Jul. 28, 2011

(65) Prior Publication Data
US 2012/0301665 A1    Nov. 29, 2012

(30) Foreign Application Priority Data

Jan. 20, 2010    (GB) .................................. 1000870.4

(51) Int. Cl.
| | |
|---|---|
| *B32B 5/02* | (2006.01) |
| *B32B 7/04* | (2006.01) |
| *B32B 3/12* | (2006.01) |
| *B32B 5/26* | (2006.01) |
| *B64C 1/00* | (2006.01) |

(52) U.S. Cl.
CPC . *B32B 3/12* (2013.01); *B32B 5/024* (2013.01); *B32B 5/026* (2013.01); *B32B 5/26* (2013.01); *B32B 7/04* (2013.01); *B32B 2260/023* (2013.01); *B32B 2260/046* (2013.01); *B32B 2262/0261* (2013.01); *B32B 2262/0284* (2013.01); *B32B 2262/106* (2013.01); *B32B 2264/0214* (2013.01); *B32B 2307/542* (2013.01); *B32B 2307/70* (2013.01); *B32B 2307/718* (2013.01); *B64C 1/00* (2013.01); *Y10T 428/24149* (2015.01); *Y10T 442/10* (2015.04)

(58) Field of Classification Search
None
See application file for complete search history.

(56) References Cited

U.S. PATENT DOCUMENTS

| | | | |
|---|---|---|---|
| H047 H * | 4/1986 | Monib | 428/116 |
| 4,879,152 A | 11/1989 | Green | |
| 4,963,408 A | 10/1990 | Huegli | |
| 6,045,898 A | 4/2000 | Kishi et al. | |
| 6,117,518 A * | 9/2000 | Cawse et al. | 428/116 |
| 6,440,257 B1 | 8/2002 | Zhou et al. | |
| 6,508,910 B2 | 1/2003 | Zhou et al. | |
| 7,709,404 B2 | 5/2010 | Kruger et al. | |
| 2004/0067705 A1 | 4/2004 | Ton-That et al. | |
| 2005/0257887 A1 | 11/2005 | Tsotsis | |
| 2006/0048881 A1 | 3/2006 | Evans et al. | |
| 2006/0252334 A1 | 11/2006 | LoFaro et al. | |
| 2008/0160860 A1 | 7/2008 | Kuroki et al. | |
| 2008/0277057 A1 | 11/2008 | Montgomery et al. | |

FOREIGN PATENT DOCUMENTS

| | | |
|---|---|---|
| EP | 0366979 A2 | 5/1990 |
| EP | 2067592 A1 | 6/2009 |

OTHER PUBLICATIONS

Monib, US Statutory Invention Registration H47, Apr. 1, 1986.

* cited by examiner

*Primary Examiner* — David Sample
*Assistant Examiner* — Nicholas W Jordan
(74) *Attorney, Agent, or Firm* — W. Mark Bielawski; David J. Oldenkamp

(57) ABSTRACT

A structural panel comprising an internal core material having first and second opposing faces, first and second face sheets bonded to the first and second opposing faces respectively, wherein the panel comprises an open-structured sheet, interposed between a first face of the core material and its respective face sheet and the panel comprises less than 200 gsm adhesive.

14 Claims, No Drawings

SANDWICH PANELS

TECHNICAL FIELD

The present invention relates to structural panels comprising a core material and two opposing face sheets, particularly for use in aerospace structural applications.

BACKGROUND TO THE INVENTION

Structural panels, also referred to as sandwich panels, comprising a lightweight core material surrounded on both sides by face sheets, find use in a wide variety of applications. Typically they are used where stiffness and structural strength of the panel are primary considerations.

In particular, sandwich panels find use as structural components of aerospace vehicles where the weight of the panel is an equally important consideration. For this reason, so-called honeycomb cores are commonly used in aerospace applications, wherein the core involves sheets of material extending between the face sheets and the majority of the core being open space.

However, further weight reductions are of continuing desirability, and importantly, this must be achieved without sacrificing structural integrity of the panel.

For example, face sheets made of prepreg material are commonly employed. Prepregs comprise at least one sheet of structural fibres, which may be woven or non-woven, which are pre-impregnated with curable resin. Such materials provide lightweight yet strong structural components and so make ideal face sheets for aerospace use.

It is conventional for such face sheets to be adhered to the core material by use of an adhesive. This is to prevent the peeling away of the face sheet from the core material.

This peeling failure mechanism is particularly relevant to honeycomb cores, as the contact area between the face sheet and core can be very small and thus represents a likely primary failure mechanism when such cores are employed.

In an attempt to further reduce the weight of such sandwich panels, so-called self-adhesive prepregs have been suggested which do not require an adhesive, thus providing a weight saving. Examples of self-adhesive prepregs for use on sandwich panels can be found in U.S. Pat. No. 6,045,898, U.S. Pat. No. 6,508,910 and U.S. Pat. No. 6,440,257.

However, by removing the adhesive it has been found that the face panels can be removed more easily requiring a lower peel force. Thus, the reduction in weight may incur a reduction in the structural integrity of such panels.

United States Statutory Invention Registration H000,047 discloses a honeycomb sandwich panel disclosing the use of a spunlaced aramid fabric between a honeycomb core and phenolic resin prepreg face sheets. Although improved peel results are claimed, the peel force is significantly less than would be acceptable for use in a structural application. Additionally, phenolic resins are not suitable for use in a structural aerospace application. Thus, additional weight is introduced without providing an acceptable peel strength.

It would therefore seem that the art has arrived at a point when further reductions in weight can only be achieved by a reduction in structural integrity.

SUMMARY OF THE INVENTION

The present invention relates to a structural panel comprising an internal core material having first and second opposing faces, first and second face sheets bonded to the first and second opposing faces respectively, wherein the panel comprises an open-structured sheet, interposed between a first face of the core material and its respective face sheet and the panel comprises less than 200 gsm adhesive.

It has been found that placing an open-structured sheet, or veil, between a face sheet and the core material can provide significant improvements to the peel strength of the face sheet. Furthermore, it has been found that the quantity of adhesive used can be significantly reduced, or even eliminated entirely, without affecting the peel strength. Thus, significant improvements in peel strength can be achieved with no net weight increase, and even may involve a reduction in weight, e.g. compared to prior art structural sandwich panels.

It has been found that some combinations of materials however do not show the improvements in peel force generally observed by use of the present invention.

Thus, preferably the panel excludes the combination of an aramid honeycomb core material, face sheets which are phenol-formaldehyde resin impregnated prepregs, and open-structured sheets which are spunlaced fabric comprising at least 50% by weight of aramid fibres.

It is believed that the poor performance of this combination may be due to a number of reasons, particularly the type of resin employed. Thus, preferably the face sheets are free of any phenol-formaldehyde resin.

In a preferred embodiment the panel comprises a second open-structured sheet interposed between a second face of the core material and its respective face sheet so that the improvements in peel strength are exhibited in both faces.

Thus, the structural panels according to the invention are capable of exhibiting a climbing drum peel test force according to international test method EN2243-3 on one and preferably both face sheets, of greater than 300 N/75 mm, preferably greater than 400 N/75 mm, more preferably greater than 500 N/75 mm most preferably greater than 600 N/75 mm.

The improved peel forces can be achieved with a structural panel having two face sheets, each comprising two fibre layers of prepreg and having an areal weight of less than 1700 gsm, preferably less than 1600 gsm.

As discussed above, the improved peel force can be achieved independently of the amount of adhesive present. Thus, the panel preferably comprises less than 100 gsm adhesive, and most preferably is substantially free of adhesive. In this way, further weight reductions in the sandwich panel can be obtained.

The core material may take a variety of forms, such as being constructed as a lightweight honeycomb, rigid foam, paper or wood. However, preferably it is a honeycomb material as this provides excellent structural properties for a very low weight of material.

The face sheets may also take a variety of forms, but are preferably prepreg sheets. A prepreg comprises a fibre structure e.g. a mat, fabric, non-woven material or roving, pre-impregnated with curable, i.e. thermosetting resin and curing agent, among other possible materials.

The amount of resin impregnated into the fibres is conveniently measured as a percentage of the weight of the prepreg. It has been found that a sufficient quantity of resin needs to be present in order for the resin to have sufficient tack and also to penetrate into the open areas of the open-structured sheet. It has also been found that increased levels of resin content tend to provide an increase in peel force. Thus, the prepreg face sheets preferably comprise at least 42 wt % thermosetting resin, more preferably at least 44 wt %.

The fibres are present as layers and each face sheet may comprise one or more layers of fibres typically two layers of fibres.

In a preferred embodiment the fibres in each layer of the prepreg extend across the whole sheet, and are preferably woven or unidirectional.

The fibres in the prepreg may be made from a number of different types of materials such as carbon fibre or glass fibre. However, carbon fibres are highly preferred.

The prepregs employed are preferably so-called self-adhesive prepregs, which are known in the art as being able to adhere to core material without the need for adhesives. Thus, preferably the prepregs used are such that they exhibit a climbing drum peel test force according to international test method EN 2243-3 of greater than 100 N/75 mm when the open-structured sheet is omitted and has a resin content of 42%.

For example, the prepregs can include thermoplastic fillet-forming particles in the resin, as disclosed in U.S. Pat. No. 6,508,910.

Thus, the fillet-forming particles are suitably selected from polyethersulphone and polyetherimide, preferably polyethersulphone. The particles can vary in size and may have a mean particle size of from 1 to 150 micrometers.

In this way the viscosity of the resin may be controlled so that it has desirable flow characteristics. Thus, preferably the resin in the prepreg has a minimum viscosity of at least 15 Pas.

The resin pre-impregnated into the prepreg face sheet may also be selected from any suitable thermosetting resin known in the art, although phenol-formaldehyde resins are preferably avoided, as discussed above.

In a preferred embodiment the resin pre-impregnated into the prepreg comprises, and preferably is substantially completely comprised of, epoxy resin.

The epoxy resin may comprise monofunctional, difunctional, trifunctional and/or tetrafunctional epoxy resins.

Suitable difunctional epoxy resins, by way of example, include those based on; diglycidyl ether of Bisphenol F, Bisphenol A (optionally brominated), phenol and cresol epoxy novolacs, glycidyl ethers of phenol-aldelyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof.

Difunctional epoxy resins may be preferably selected from diglycidyl ether of Bisphenol F, diglycidyl ether of Bisphenol A, diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl ethers, epoxidised olefins, brominated resins, triglycidyl aminophenyls, aromatic glycidyl amines, heterocyclic glycidyl imidines and amides, glycidyl ethers, fluorinated epoxy resins, or any combination thereof.

Suitable tetrafunctional epoxy resins include N,N,N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY721 from Huntsman Advanced Materials).

The open-structured sheet, or veil, allows any resin from the face sheet to pass into its open structure and to come into contact with a face of the core material. This arrangement is believed to provide the improved peel strength by the open-structured sheet forming a strong bond with both the core material and the face sheet. Thus, the open-structured sheet is resin-permeable such that resin passes through the sheet to come into contact with a face of the core material before or during cure.

The open-structured sheet typically is an integral sheet held together by overlapping and/or interconnecting fibres. Such fibres may be woven, or knitted, for example. The fibres may also be random e.g. spunlaced or laid scrim, although woven or knitted is preferred. Such a sheet is often referred to in the art as a veil.

The open-structured sheet may be characterised by the degree of openness of the sheet, i.e. the percentage of an average surface area of the sheet which is made up of open holes in the sheet. The open-structured sheets of the present invention typically have a degree of openness of from 10% to 95%, preferably from 30% to 90%, more preferably from 50% to 80%. This helps to maintain a lightweight sheet and also allows the free passage of resin.

The material of the open-structured sheet may be selected from a wide range of materials, but is preferably a polymeric material, such as nylon, polyethylene terephthalate and the like. However, aramid materials are not generally preferred and therefore is preferably excluded.

It has been found that the improvements in peel force can be achieved even though the veil is very lightweight. This is particularly important for aircraft structural applications. Thus, preferably the open-structured sheet has a weight per unit area of from 4 to 50 grams per square meter (or gsm), more preferably from 4 to 30 gsm, most preferably from 10 to 30 gsm.

The improved structural panels of the present invention may be used in a wide variety of applications where a lightweight but structurally strong panel is needed. However, the panel is particularly useful in aerospace applications, where the requirements for strength and weight are particularly exacting.

The sandwich panels according to the present invention are typically assembled together from their component structures and then cured by exposure to elevated temperature, and optionally elevated pressure, to cure the resin, firmly bonding the face sheets to the core material.

In a preferred method of construction, the face sheets are first combined with the open-structured sheet. Typically a proportion of any uncured resin will seep into the open structure of the sheet, so that a single sheet of material is formed.

Thus, in another aspect, the invention relates to a method of manufacturing a structural panel, comprising bringing first and second face sheets wherein the face sheets each comprise an open-structured sheet intimately bonded thereto, into contact with first and second opposing faces of a core material and bonding them thereto, such that the open-structured sheets are brought into contact with the first and second opposing faces.

The method according to the invention can include any of the technical features discussed above in the context of the structured panel according to the invention.

EXAMPLES

A range of different sandwich panels were manufactured. Each one included a honeycomb core material with two face sheets of prepreg bonded to its outer faces. In examples according to the invention, a veil was placed in contact with the prepreg before bringing the modified prepreg into contact with the honeycomb core.

The sandwich panels were then cured in an autoclave with a temperature increase of 2° C. per minute until it reached 180° C. It was then left for 2 hours at 180° C. at a pressure of 3 bar.

The cured panels were then tested for their climbing drum peel value (according to test method EN2243-3) and the value being expressed in Newtons per 75 mm width of strip. The areal weight of each veil is also shown in grams per square meter (gsm) in parenthesis.

The properties of the sandwich panels and the climbing drum peel results are shown in Table 1.

Open Cell is a 9 gsm laid scrim supplied by Bafatex. Aramid is a 15 gsm spunlaced aramid veil supplied by Hovo.

The 300 gsm adhesive is Redux 319 available from Hexcel.

The Kevlar core is HRH-36 available from Hexcel (thickness 0.5 inch, cell size 1/8 inch, density 6 lb/ft$^3$).

The Nomex core is HRH-10 available from Hexcel (thickness 0.5 inch, cell size 1/8 inch, density 8 lb/ft$^3$).

Examples 1 and 2 are comparative examples, showing the peel strengths achieved by self-adhesive prepregs without an open-structured sheet, or veil.

TABLE 1

| | | 1 | 2 | 3 | 4 | 5 | 6 | 7 | 8 | 9 | 10 | 11 |
|---|---|---|---|---|---|---|---|---|---|---|---|---|
| Prepreg | Epoxy Resin 1 | | ✓ | ✓ | ✓ | | | | | | | |
| | Epoxy Resin 2 | ✓ | | | | ✓ | ✓ | ✓ | ✓ | ✓ | ✓ | ✓ |
| | Resin content (%) | 50 | 50 | 50 | 50 | 50 | 50 | 50 | 50 | 50 | 44 | 50 |
| | Phenolic Resin | | | | | | | | | | | |
| | Carbon Fibre | ✓ | ✓ | ✓ | ✓ | ✓ | ✓ | ✓ | ✓ | ✓ | ✓ | ✓ |
| | Glass Fibre | | | | | | | | | | | |
| | Veil openness | — | — | 68 | 81 | 77 | 50 | 95 | 54 | 68 | 68 | 81 |
| Veil Type | PET (20) | | | ✓ | | | | | | ✓ | ✓ | |
| | Nylon 1 (10) | | | | ✓ | | | | | | | ✓ |
| | Nylon 2 (20) | | | | | | | | ✓ | | | |
| | Nylon 3 (20) | | | | | | | | | | | |
| | Nylon 4 (4) | | | | | | ✓ | | | | | |
| | Nylon 5 (6) | | | | | | | ✓ | | | | |
| | Open Cell (9) | | | | | | | | | | | |
| | Aramid (15) | | | | | ✓ | | | | | | |
| Adhesive | 300 gsm | | | | | | | | | | | |
| Core | Kevlar | | | | | | | | | | | |
| | Nomex | ✓ | ✓ | ✓ | ✓ | ✓ | ✓ | ✓ | ✓ | ✓ | ✓ | ✓ |
| Peel Force (N/75 mm) | | 210 | 115 | 402 | 281 | 227 | 248 | 172 | 643 | 777 | 400 | 446 |

| | | 12 | 13 | 14 | 15 | 16 | 17 | 18 | 19 | 20 | 21 |
|---|---|---|---|---|---|---|---|---|---|---|---|
| Prepreg | Epoxy Resin 1 | | | | | | | | | | |
| | Epoxy Resin 2 | ✓ | ✓ | ✓ | ✓ | ✓ | ✓ | ✓ | ✓ | ✓ | |
| | Resin content (%) | 50 | 50 | 44 | 44 | 50 | 50 | 50 | 50 | 50 | 41 |
| | Phenolic Resin | | | | | | | | | | ✓ |
| | Carbon Fibre | ✓ | ✓ | ✓ | ✓ | ✓ | ✓ | ✓ | ✓ | ✓ | |
| | Glass Fibre | | | | | | | | | | ✓ |
| | Veil openness | 22 | 61 | 54 | — | — | 68 | 81 | 61 | 54 | 22 |
| Veil Type | PET (20) | | | | | | ✓ | | | | |
| | Nylon 1 (10) | | | | | | | ✓ | | | |
| | Nylon 2 (20) | | | ✓ | | | | | | ✓ | |
| | Nylon 3 (20) | | ✓ | | | | | | ✓ | | |
| | Nylon 4 (4) | | | | | | | | | | |
| | Nylon 5 (6) | | | | | | | | | | |
| | Open Cell (9) | | | | | | | | | | |
| | Aramid (15) | ✓ | | | | | | | | | ✓ |
| Adhesive | 300 gsm | | | | ✓ | ✓ | | | | | |
| Core | Kevlar | | | | | ✓ | ✓ | ✓ | ✓ | ✓ | ✓ |
| | Nomex | ✓ | ✓ | ✓ | ✓ | | | | | | |
| Peel Force (N/75 mm) | | 382 | 576 | 667 | 286 | 166 | 441 | 460 | 410 | 270 | 85 |

Epoxy resin 1 is 8552 available from Hexcel and epoxy resin 2 is M83 also available from Hexcel. Both are standard 180° C. cure epoxy resins based on a polyethersulphone toughened epoxy resin comprising glycidyl amines with an aromatic amine curing agent.

PET is a 20 gsm polyethylene terephthalate knitted 3D veil supplied by Dylco, France.

Nylon 1 is a 10 gsm knitted nylon A1050 veil available from Heathcoat, Devon, UK. Nylon 2 is a 20 gsm woven nylon F0823 veil which is used as a carrier for adhesive Redux 319 available from Hexcel but without the adhesive. Nylon 3 is a 20 gsm knitted 3D nylon veil supplied by Dylco, France. Nylon 4 is a 4 gsm spunlaced nylon veil available as 128D04 from Protechnic. Nylon 5 is a 6 gsm spunlaced nylon veil available as 128D06 from Protechnic.

Examples 3 and 4 show improvements in peel force when preferred veils according to the invention are employed.

Examples 5 to 7 show the less of an improvement when the less preferred veils are employed.

Examples 8 to 13 show improvements in peel force when preferred veils according to the invention are employed.

Examples 14 and 15 show the effect of removing the veil from an adhesive. It can be seen that almost all of the peel force can be attributed to the veil and not to the adhesive itself.

Example 16 is another comparative example without a veil and on the Kevlar core which generally provides a lower peel force than Nomex.

Examples 16 to 20 show the improvements in peel force when preferred veils according to the invention are employed.

Example 21 is a phenolic resin panel which has a very poor peel strength and is unsuitable for use in a structural application.

The invention claimed is:

1. An uncured structural sandwich panel comprising:
   a honeycomb core having first and second opposing faces;
   a first prepreg face sheet that is located next to the first face of said honeycomb core, said first prepreg sheet comprising carbon fibers and an uncured thermosetting resin comprising epoxy resin, polyethersulphone and a curing agent for said epoxy resin wherein the amount of uncured thermosetting resin in said first prepreg face sheet is equal to at least 44 weight percent, based on the total weight of said first prepreg face sheet; and
   a first open-structured sheet that is interposed between the first face of said honeycomb core and said first prepreg face sheet, said first open-structured sheet weighing from 10 to 30 grams per square meter and consisting of polyethylene terephthalate.

2. The uncured structural sandwich panel according to claim 1, which comprises:
   a second prepreg face sheet that is located next to the second face of said honeycomb core, said second prepreg sheet comprising carbon fibers and an uncured thermosetting resin comprising epoxy resin, polyethersulphone and a curing agent for said epoxy resin wherein the amount of uncured thermosetting resin in said second prepreg sheet is equal to at least 44 weight percent, based on the total weight of said second prepreg face sheet; and
   a second open-structured sheet that is interposed between the second face of said honeycomb core and said second prepreg face sheet, said second open-structured sheet weighing from 10 to 30 grams per square meter and consisting of polyethylene terephthalate.

3. The uncured structural sandwich panel according to claim 2, wherein the second open-structured sheet has a degree of openness of from 50 to 80%.

4. The uncured structural sandwich panel according to claim 2 wherein the amount of uncured thermosetting resin in said second prepreg face sheet is equal to at least 50 weight percent, based on the total weight of said second prepreg face sheet.

5. The uncured structural sandwich panel according to claim 4 wherein the amount of uncured thermosetting resin in said first prepreg face sheet is equal to at least 50 weight percent, based on the total weight of said first prepreg face sheet.

6. A structural sandwich panel which comprises the uncured structural sandwich panel according to claim 2 wherein said uncured thermosetting resin in said first prepreg face sheet has been cured to form cured thermosetting resin that has migrated through said first open-structured sheet into bonding contact with the first face of said honeycomb core and wherein said uncured thermosetting resin in said second prepreg face sheet has been cured to form cured thermosetting resin that has migrated through said second open-structured sheet into bonding contact with the second face of said honeycomb core.

7. The structural sandwich panel according to claim 6 wherein the amount of uncured thermosetting resin in said second prepreg face sheet is equal to at least 50 weight percent, based on the total weight of said second prepreg face sheet.

8. The structural sandwich panel according to claim 7 wherein the amount of uncured thermosetting resin in said first prepreg face sheet is equal to at least 50 weight percent, based on the total weight of said first prepreg face sheet.

9. An aircraft structural panel which comprises the structural sandwich panel according to claim 6.

10. The uncured structural sandwich panel according to claim 1 wherein the first open-structured sheet has a degree of openness of from 50 to 80%.

11. The uncured structural sandwich panel according to claim 1 wherein the amount of uncured thermosetting resin in said first prepreg face sheet is equal to at least 50 weight percent, based on the total weight of said first prepreg face sheet.

12. A structural sandwich panel which comprises the uncured structural sandwich panel according to claim 1 wherein said uncured thermosetting resin in said first prepreg face sheet has been cured to form a cured thermosetting resin that has migrated through said first open-structured sheet into bonding contact with the first face of said honeycomb core.

13. The structural sandwich panel according to claim 12 wherein the amount of uncured thermosetting resin in said first prepreg face sheet is equal to at least 50 weight percent, based on the total weight of said first prepreg face sheet.

14. An aircraft structural panel which comprises the structural sandwich panel according to claim 12.

* * * * *